ical phosphazene to be decolorized. Commercial ozone generators provide oxygen or air containing from 1% to 2% ozone. The amount of ozone necessary for the bleaching operation is easily available.

3,839,513
DECOLORIZATION OF POLYMERIC PHOSPHAZENES WITH OZONE
Vithal Chhotabhi Patel, Glen Burnie, Md., assignor to FMC Corporation, New York, N.Y.
No Drawing. Filed Sept. 28, 1972, Ser. No. 292,881
Int. Cl. C07d 105/04; C08b 21/20
U.S. Cl. 260—989                    8 Claims

ABSTRACT OF THE DISCLOSURE

Discolored polymeric phosphazenes are decolorized by contacting the phosphazene with ozone at a temperature of 20 to 70° C. for a period of at least two minutes.

---

This invention relates to a process for decolorizing polymeric phosphazenes with ozone.

Polymeric phosphazenes are ring or chain compounds which contain alternating phosphorus and nitrogen atoms in the skeleton, with two substituents on each phosphorus atom. Phosphazenes are typically represented by the general formula:

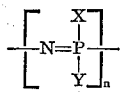

in which general formula $n$ is 3 or more, often 3 to 14, but substantially 3 to 6, and X and Y represent the same or different substituents including —OR groups wherein R is aliphatic, cycloaliphatic, or aromatic radical, said aliphatic radical being straight or branch chained and having 1 to 12 carbon atoms, preferably is an alkyl or chloroalkyl radical having 1 to 12, most preferably from 2 to 6 carbon atoms, the cycloaliphatic radicals have 4 to 6 carbon atoms and the aromatic radicals have 6 to 10 carbon atoms; R may also have substituent groups including halogen groups. X and/or Y can also be —SR wherein R is as previously described. Some of the X and Y substituents can be halogen which remains from the precursor phosphonitrilic halide polymer. Usually the halogen is chlorine. The X and Y substituents also include —NR$_1$R$_2$ wherein R$_1$ is hydrogen and R$_2$ is a lower aliphatic group, or R$_1$ and R$_2$ are aliphatic, cycloaliphatic or aromatic groups as described for R above, or together R$_1$, R$_2$ and —N form a 5 or 6 membered nitrogen-containing heterocyclic group.

The polymeric alkoxyphosphazenes are important items of commerce and are dispersed in regenerated cellulose filaments to provide flame-retarded filaments and filamentary articles. The alkoxyphosphazenes are generally made by reacting polymeric phosphonitrilic chloride (PNC) with sodium alkoxide. A simplified reaction sequence is represented structurally as follows:

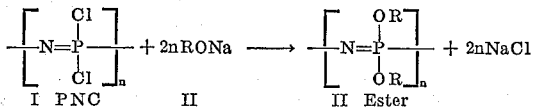

In the above formulae $n=3$ to 14 or more but substantially 3 to 6. Formulae I and III represent cyclic or linear polymers or mixtures of cyclic and linear polymers and R is as previously described. It is to be understood that linear esters possess end-capping groups not adequately described by formula III. Linear esters may be represented by the structure:

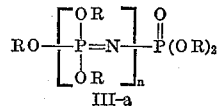

although end-capping groups other than those shown may also be present. Similarly the linear portion of polymer I can be represented as Cl$^-$(PCl$_2$=N)$_n$PCl$_3$+Z$^-$, where Z$^-$=Cl$^-$ or PCl$_6^-$. Again, other end-capping may be present.

A typical cyclic ester molecule, when $n=3$, is represented by the following structure:

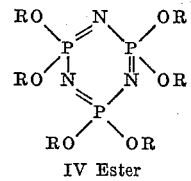
IV Ester

A modified version of the ester, IV, can be made by reacting the ester with acid halides, e.g., PNC (I) or POCl$_3$. The structure of modified ester derived from IV by reacting a cyclic trimeric ester with POCl$_3$, can be represented as follows:

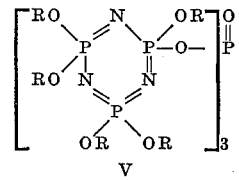

R having the same meaning as described above.

Other modifications can be made by reacting phosphonitrilic chloride polymers with diols to esterify and connect polymer units at the same time. Ethylene glycol results in ethylene bridges between phosphazene groups and is represented as having the structure:

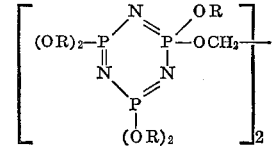

wherein R is as previously described.

Unfortunately, the phosphazenes develop color during their manufacture. The conventional methods of purification, washing, filtration, distillation, solids treatments, either do not work or are too expensive to produce low-color esters. Treatment with oxidizing agents, hydrogen peroxide, peracetic acid, persulfates, hypochlorites; or reducing agents, alkali metal hydrides; chelating agents, ethylenediamine tetraacetic acid, reduce the color, if any, to a negligible extent. Hence, a reliable and economical method for bleaching the flame retardant is desirable.

In accordance with the present invention there is provided a process for reducing the color of phosphazenes in which the phosphazenes are treated with ozone. Treatment may be accomplished with ozone, ozonated air or ozonated oxygen.

Ozone is unique in the sense that it is reliable and reduces the color to any reasonable desirable level without any treatment loss of the product. The ozone apparently works by destroying the chromophores. The decomposition products of the chromophores appear to be in trace amounts and do not affect the product properties except sometimes for an unobjectionably slight increase in acidity.

Activated carbon treatment is a treatment which reduces the color. However, the results of this treatment are inconsistent and unreliable and the treatment does not reduce the color to a desirable level. Besides, significant amounts of the ester are lost as adsorption losses.

The amount of ozone required to bleach the phosphazene will depend upon the amount of chromophores present. In practice 0.005 to 0.1 and preferably 0.01 g. to 0.07 g. of ozone is consumed per 100 g. of polymeric phosphazene to reduce the phosphazene color by one Gardner unit, in the color range of 18 to 3 Gardner (the Gardner color system is described in ASTM D–1544–68). Less ozone per Gardner color unit is required at the high end of this color range. Phosphazenes with very dark colors, well above maximum Gardner scale of 18, can also be easily bleached. Practical limits appear to be 0.03 to 0.05% consumed ozone per Gardner unit color reduction in the Gardner scale ranges of color. Thus, the total amount of ozone consumed depends on the initial color of the phosphazene and the final acceptable color desired.

The bleaching phenomenon takes place readily at ambient temperature. Temperature effects are not well established. Rate of bleaching increases with increasing reaction temperature. A temperature range of 20–70° C. appears to be satisfactory, 50–70° C. preferred. Higher than 70° C. may be used but there is a danger of damage to the desirable properties of the ester, as well as onset of thermal discoloration reactions which in effect lower the net decolorization efficiency of ozone.

Time required for bleaching the phosphazene depends upon the concentration and rate of ozone input, the type of mixing system used and the viscosity of the ester. An efficient mixing system and low viscosity phosphazenes are desirable for better bleaching rates, although more viscous esters can be accommodated if adequate gas-liquid contacting is provided.

The time varies from a few minutes on a few hundred gram-scale, using a lab-scale coarse sintered glass sparger, to hours for pilot plant-scale equipment to reduce color by one Gardner unit.

If mixing and gas absorption factors are well designed, time for a batch reaction is fixed by the rate of ozone input to fulfill the preferred requirement of 0.01 to 0.07 g. of ozone consumed by 100 g. of phosphazene being bleached. The ozonization may also be conducted continuously, in which event contact must be sufficient for the absorption and consumption of the required proportion of ozone.

Usually, the ozone treatment is carried out at atmospheric pressure. However, the treatment can be carried out under superatmospheric pressure, in which case the rate of bleaching will probably increase because of better absorption of ozone under pressure.

The ozone is generated by ozonizing air or oxygen, hence the ozone is diluted with air or oxygen. The ozone content of ozonated air can vary from 0.05 to 2.0 g. per cubic foot of air, depending upon air feed rate, voltage, and air pressure in lab-scale ozonator (Welsbach Model T–408). Higher concentrations of ozone are easily obtained by ozonating oxygen rather than air. Usually, the ozone is used in its diluted form. However, it can further be diluted with inert gases or concentrated before its use.

It is preferable not to dilute the ester, especially those with low viscosity, before ozone treatment, as this will increase processing costs. However, it may be necessary to dilute high viscosity esters with an inert solvent such as monochlorobenzene for efficient bleaching. The decision as to whether to dilute the ester will depend upon the efficiency and capacity of the gas-liquid contacting device in use. An inefficient contactor may require dilution to achieve adequate absorption of ozone.

The following examples are provided to illustrate this invention further. The proportions in the examples and in the rest of the application are by weight unless otherwise indicated.

EXAMPLE I

Ozonized air, containing 1.2 g. of ozone per cu. ft. of air, was bubbled through 150 g. of polymeric n-propoxyphosphazene at 50° C. in a 500-ml. gas-washing bottle equipped with a coarse sintered glass sparger (1" x ½" O.D.), at a rate of 0.02 c.f.m. for 30 minutes. The exit gases from the reactor were scrubbed through potassium iodide solution to determine the amount of unabsorbed ozone. At the end of the ozone treatment, air was swept through the product to expel volatiles which may be present and residual ozone. The ester color was reduced from 12.5 Gardner to 5 Gardner at the expense of 0.505 g. of ozone consumed.

EXAMPLE II

Example I was repeated at 25° C. The color of the ester was reduced from 12.5 Gardner to 6 Gardner at the expense of 0.382 g. of ozone consumed by the oxidation.

EXAMPLE III

The bleaching of polymeric n-propoxyphosphazene with ozone was carried out in a continuous process.

The reactor was made of 52" long, 2⅛" I.D. glass tube equipped with a sintered glass sparger (1" x ½" O.D.) and a product inlet and waste gas outlet at the top and product outlet and ozone feed at the bottom of the reactor. The reactor was maintained at 50° C. by heat supplied by heating tape. The unit was equipped with other necessary equipment, e.g., feed pump for continuous operation.

The reactor was charged initially with 1445 g. of the ester at 50° C. and then the ester feed and ozonized air feed, containing 0.445 g. of ozone per cu. ft. of air at the rate of 0.01 c.f.m., were started. A constant liquid level was maintained in the reactor by maintaining ester feed rate and product take-off rate constant at about 37.5 g. per minute. The color of the ester, with 30-minutes' residence time, was reduced from 14.5 Gardner to 11 Gardner at the expense of 0.105 g. of ozone consumed per 100 g. of ester.

EXAMPLE IV

Ozonized oxygen, containing 2 g. ozone per cu. ft. of oxygen, was bubbled at 0.04 c.f.m. feed rate through 300 g. of polymeric n-propoxyphosphazene at 50–53° C., as in Example I, for 40 minutes. The color of the ester was reduced from 15.5 Gardner to 8 Gardner. The amount of unabsorbed ozone was not determined.

EXAMPLE V

Example IV was repeated on a 220 g. sample of 0.01 c.f.m. ozonized oxygen (containing 6 g. ozone per cu. ft.) feed rate. The color was reduced from 9 Gardner to 2.5 Gardner in 10 minutes.

EXAMPLE VI

Ozonized air, containing 2 g. of ozone per cu. ft. of air at 0.09 c.f.m., was bubbled through 335 g. of highly viscous polymeric n-propoxyphosphazene with P—O—P oxygen linkage (prepared through condensation of polymeric n-propoxyphosphazene and phosphorus oxychloride with elimination of propyl chloride, Structure V in text) at 50° C. for 8.5 hours. The ester color was reduced from very dark (18 Gardner, after dilution with 1.5 times its volume with acetone) to 11 Gardner.

EXAMPLE VII

The ozonized air, containing 1.5 g. of ozone per cu. ft. of air, was bubbled through 10 g. of polymeric n-propoxyphosphazene with P—O—P linkage (prepared through condensation of polymeric n-propoxyphosphazene and polymeric phosphonitrilic chloride with elimination of propyl chloride) in a test tube at 50° C. for 10 minutes. The ester color was reduced from 14 Gardner to 6.5 Gardner.

EXAMPLE VIII

Example VII was repeated on 20 g. of a 50% solution of the ester in monochlorobenzene. The color of the product was reduced from 7.5 Gardner to 4.5 Gardner.

EXAMPLE IX

A mixture of 50 g. of polymeric n-propoxyphosphazene and 0.1 g. of sodium borohydride was stirred at the conditions indicated in Table I. The resulting product was filtered before measuring the color. The same procedure was followed to evaluate other solids as decolorizing agents.

Hydrogen peroxide and peracetic acid were evaluated as follows: The ester was stirred with the solution of the oxidizing agent as above. The resulting mixture was washed with water and dried under vacuum before measuring the color.

The conditions and results of these evaluations are given in Table I.

TABLE I

| Test No. | Ester batch No. | Test candidate | Amount, percent[1] | Color, Gardner | | |
|---|---|---|---|---|---|---|
| | | | | Before treatment | After treatment | |
| | | | | | 20 hrs. at 25° C. | Additional 1 hr. at 50-60° C. |
| 1 | 1 | Sodium perborate | 0.2 | 9 | 9 | 9 |
| 2 | 2 | do | 0.2 | 9 | 9 | 9 |
| 3 | 1 | Ammonium persulfate | 0.2 | 9 | 9 | 9 |
| 4 | 1 | Potassium persulfate | 0.2 | 9 | 9 | 9 |
| 5 | 2 | do | 0.2 | 9 | 9 | 9 |
| 6 | 1 | Calcium hypochlorite | 0.5 | 9 | 9 | 9 |
| | | | | | 2 days at 25° C. | Additional 4 hrs. at 50° C. |
| 7 | 3 | Sodium borohydride | 0.2 | 9 | 7 | 7 |
| 8 | 4 | do | 0.2 | 11.5 | 11 | 11 |
| 9 | 5 | Lithium borohydride | 0.2 | 6 | 4.5 | 4.5 |
| 10 | 2 | 50% H$_2$O$_2$ | [2]5 | 9 | 8 | [4]7 |
| 11 | 2 | Water wash only | 0 | 9 | | [4]7.5 |
| 12 | 1 | 50% H$_2$O$_2$ | [2]5 | 9 | | [4]7.0 |
| 13 | 3 | 50% H$_2$O$_2$ | [2]5 | 9 | | [5]8 |
| 14 | 3 | 20% peracetic acid in DIBK-AA[3] | [2]2 | 9 | | [5]7 |
| 15 | 1 | Ozone | [2]0.2 | 9 | | [6]2.5 |

[1] Based on ester.
[2] 100% basis.
[3] Diisobutylketone and acetic acid solution.
[4] 20 hrs. at 25° C. and additional 1 hr. at 50-60° C.
[5] 2 days at 25° C. and additional 4 hrs. at 50° C.
[6] Total of 10 minutes at 50-60° C.

What is claimed is:

1. A process for decolorizing polymeric phosphazenes comprising contacting the phosphazene with ozone in which the polymeric phosphazenes are represented by the general formula

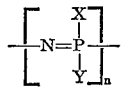

representing both cyclic and linear polymers in which general formula $n$ is 3 or more, often 3 to 14, but substantially 3 to 6, and X and Y represent the same or different —OR groups where R represents an alkyl or chloroalkyl radical having from 1 to 12 carbon atoms.

2. The process of claim 1 in which the ozone is obtained by ozonizing air.

3. The process of claim 1 in which the ozone is obtained by ozonizing oxygen.

4. The process of claim 1 in which the temperature is 20° C. to 70° C.

5. The process of claim 1 wherein R is an alkyl radical having from 2 to 6 carbon atoms.

6. The process of claim 1 in which the polymeric phosphazenes are represented by the general formula:

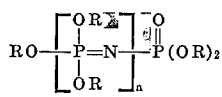

in which general formula $n$ is 3 or more, often 3 to 14.

7. The process of claim 1 in which the polymeric phosphazenes are represented by the general formula:

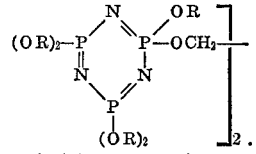

8. The process of claim 1 in which the polymeric phosphazenes are represented by the general formula:

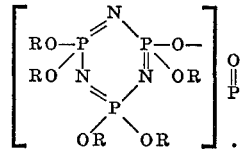

References Cited

UNITED STATES PATENTS 2,980,723    4/1961    Frank et al. _____ 260—989

OTHER REFERENCES

Kirk-Othmer, "Encyclopedia of Chemical Technology," second edition (1967), pp. 419 and 431.

ANTON H. SUTTO, Primary Examiner

U.S. Cl. X.R.

260—927 N; 106—168

UNITED STATES PATENT OFFICE
CERTIFICATE OF CORRECTION

PATENT NO. : 3,839,513
DATED : October 1, 1974
INVENTOR(S) : Vithal C. Patel

It is certified that error appears in the above-identified patent and that said Letters Patent are hereby corrected as shown below:

Column 6, line 40, Claim 7, formula read

" 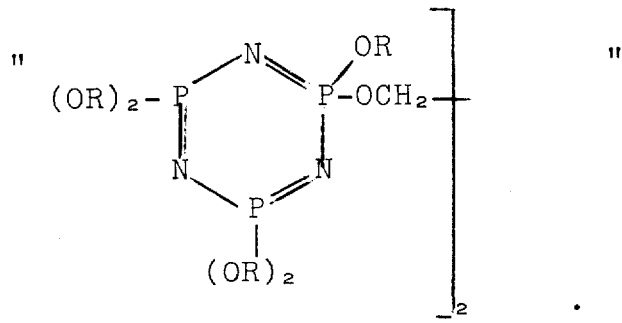 "

should read

-- 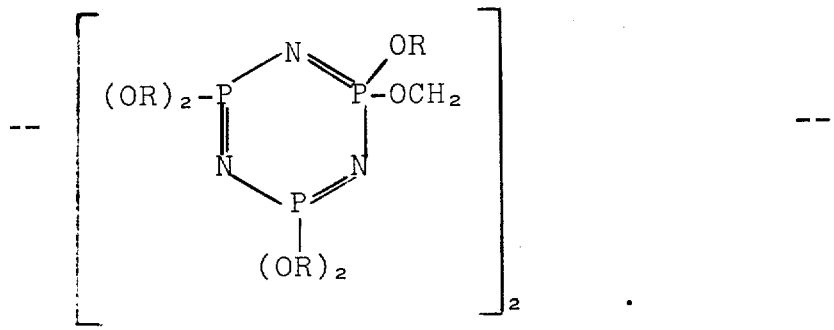 --

Signed and Sealed this ninth Day of September 1975

[SEAL]

Attest:

RUTH C. MASON
Attesting Officer

C. MARSHALL DANN
Commissioner of Patents and Trademarks

Page 2

UNITED STATES PATENT OFFICE
CERTIFICATE OF CORRECTION

PATENT NO. : 3,839,513

DATED : October 1, 1974

INVENTOR(S) : Vithal C. Patel

It is certified that error appears in the above-identified patent and that said Letters Patent are hereby corrected as shown below:

Column 6, Claim 8, line 49, formula reads

" 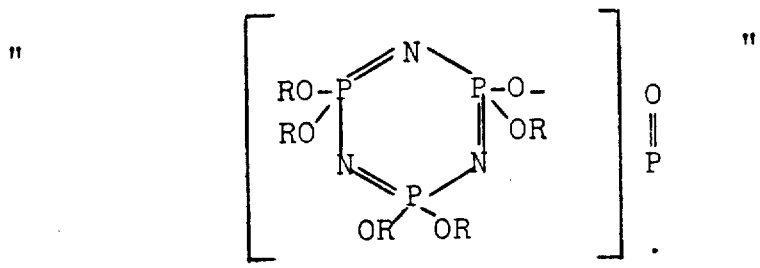 " , should read

-- 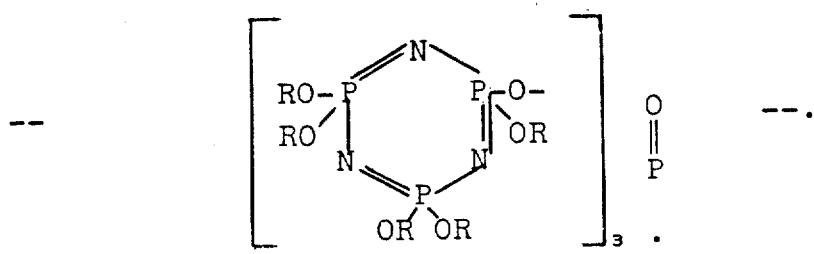 --.

Signed and Sealed this ninth Day of September 1975

[SEAL]

Attest:

RUTH C. MASON
Attesting Officer

C. MARSHALL DANN
Commissioner of Patents and Trademarks